(12) United States Patent
Heo

(10) Patent No.: US 7,020,176 B2
(45) Date of Patent: Mar. 28, 2006

(54) METHOD AND SYSTEM FOR DOWNLINK CHANNELIZATION CODE ALLOCATION IN A UMTS

(75) Inventor: Won-Suk Heo, Seoul (KR)

(73) Assignee: Samsung Electronics Co., Ltd., (KR)

( * ) Notice: Subject to any disclaimer, the term of this patent is extended or adjusted under 35 U.S.C. 154(b) by 892 days.

(21) Appl. No.: 10/020,285

(22) Filed: Oct. 30, 2001

(65) Prior Publication Data

US 2003/0081584 A1  May 1, 2003

(51) Int. Cl.
H04B 1/69 (2006.01)
H04B 1/707 (2006.01)
H04B 1/713 (2006.01)

(52) U.S. Cl. .............. 375/130; 375/260; 375/285; 375/296; 375/343; 375/367

(58) Field of Classification Search ............. 375/260, 375/272–280, 285, 343, 367, 164; 370/203, 370/130
See application file for complete search history.

(56) References Cited

U.S. PATENT DOCUMENTS

| | | | |
|---|---|---|---|
| 6,091,757 A * | 7/2000 | Cudak et al. ............... 375/130 |
| 6,526,065 B1 * | 2/2003 | Cheng ....................... 370/441 |
| 6,552,996 B1 * | 4/2003 | Kim et al. .................. 370/209 |
| 6,876,690 B1 * | 4/2005 | Imbeni et al. .............. 375/130 |
| 2002/0018457 A1 * | 2/2002 | Choi et al. .................. 370/342 |
| 2002/0089952 A1 * | 7/2002 | Cao et al. ................... 370/335 |
| 2002/0171568 A1 * | 11/2002 | Yang ........................... 341/96 |
| 2003/0026235 A1 * | 2/2003 | Vayanos et al. ............. 370/342 |
| 2003/0081692 A1 * | 5/2003 | Kwan et al. ................ 375/295 |

* cited by examiner

*Primary Examiner*—Stephen Chin
*Assistant Examiner*—Erin M. File
(74) *Attorney, Agent, or Firm*—Dilworth & Barrese LLP

(57) ABSTRACT

A method and system for downlink channelization code allocation or assignment in a Universal Mobile Telecommunication System (UMTS) are presented. The method and system generate an optimal channelization or Orthogonal Variable Spreading Factor Orthogonal Variable Spreading Factor (OVSF) code to be assigned to a new channel through a route having the minimum influence while maintaining the existing or assigned OVSF codes. The inventive method and system leave reserved codes by managing generation and release of the OVSF codes. This prevents situations where the new channel cannot be assigned an OVSF code due to a lack of OVSF codes, even though there is enough available power and enough available channels.

26 Claims, 5 Drawing Sheets

METHOD AND SYSTEM FOR DOWNLINK CHANNELIZATION CODE ALLOCATION IN A UMTS

BACKGROUND OF THE INVENTION

1. Technical Field

The present disclosure relates generally to a Universal Mobile Telecommunication System (UMTS), and more particularly, to a method and system for assigning an optimal Orthogonal Variable Spreading Factor (OVSF) code, also known as a channelization code, for separation of downlink channels to a new channel, while maintaining the existing OVSF codes.

2. Background of the Related Art

Spreading is applied to the physical channels of a UMTS, an asynchronous IMT-2000 system. Spreading consists of two operations. The first operation is the channelization operation, which transforms every data symbol into a number of chips, thus increasing the bandwidth of the signal. The number of chips per data symbol is called the Spreading Factor (SF). The second operation is the scrambling operation, where a scrambling code is applied to the spread signal.

During the channelization operation, data symbols on so-called I- and Q-branches are independently multiplied with an OVSF code. With the scrambling operation, the resultant signals on the I- and Q-branches are further multiplied by a complex-valued scrambling code, where I and Q denote real and imaginary parts, respectively. The channelization codes are OVSF codes that preserve the orthogonality between a user's different physical channels. The OVSF codes can be defined using the code tree of FIG. 1.

In FIG. 1, the channelization codes are uniquely described as $C_{ch,SF,k}$, where SF is the spreading factor of the code and k is the code number, $0 \leq k \leq SF-1$. Each level in the code tree defines channelization codes of length SF, corresponding to a spreading factor of SF in FIG. 1.

The generation method for the channelization code is defined as:

$$C_{ch,1,0}=1,$$

$$\begin{bmatrix} C_{ch,2,0} \\ C_{ch,2,1} \end{bmatrix} = \begin{bmatrix} C_{ch,1,0} & C_{ch,1,0} \\ C_{ch,1,0} & -C_{ch,1,0} \end{bmatrix} = \begin{bmatrix} 1 & 1 \\ 1 & -1 \end{bmatrix}$$

$$\begin{bmatrix} C_{ch,2^{(n+1)},0} \\ C_{ch,2^{(n+1)},1} \\ C_{ch,2^{(n+1)},2} \\ C_{ch,2^{(n+1)},3} \\ \vdots \\ C_{ch,2^{(n+1)},2^{(n+1)}-2} \\ C_{ch,2^{(n+1)},2^{(n+1)}-1} \end{bmatrix} = \begin{bmatrix} C_{ch,2^n,0} & C_{ch,2^n,0} \\ C_{ch,2^n,0} & -C_{ch,2^n,0} \\ C_{ch,2^n,1} & C_{ch,2^n,1} \\ C_{ch,2^n,1} & -C_{ch,2^n,1} \\ \vdots & \vdots \\ C_{ch,2^n,2^n-1} & C_{ch,2^n,2^n-1} \\ C_{ch,2^n,2^n-1} & -C_{ch,2^n,2^n-1} \end{bmatrix}$$

The leftmost value in each channelization code word corresponds to the chip transmitted first in time.

The channelization code, a spreading code, uses a different SF according to a rate of the user. The SF has a value of a multiple of 4, so that the SF has a value of SF=4 to SF=256.

As illustrated in FIG. 1, an increase in the SF value causes an increase in the number of available channelization codes. When a specific code is generated (divided) into two codes at each node, i.e., when the SF value is doubled, the generated two codes include one code calculated by doubling the specific code and another code calculated by adding the specific code to its inversed code. The UMTS system matches an SF value (=4 to 256) of the OVSF code to the data rate. For example, to maintain 3.84 Mchips/s, the UMTS system uses a low SF for a high data rate, and a high SF for a low data rate.

FIG. 2 shows how to spread and scramble a downlink physical channel. The downlink physical channel is subjected to complex multiplexing into I and Q channels, which are first multiplied by a channelization code for spreading and then, multiplied by a scrambling code for cell identification. FIG. 2 illustrates the spreading operation for all downlink physical channels except the Synchronization Channel (SCH), i.e. for P-CCPCH (Common Control Physical Channel), S-CCPCH, CPICH (Common Pilot Channel), AICH (Acquisition Channel), PICH, PDSCH (Physical Dedicated Shared Channel), and downlink DPCH (Dedicated Physical Channel). The non-spread physical channel consists of a sequence of real-valued symbols. For all channels except AICH, the symbols can take one of the three values of +1, −1, and 0, where 0 indicates discontinuous transmission (DTX).

Each pair of two consecutive symbols is first serial-to-parallel converted and mapped to an I and a Q branch. The mapping is such that even and odd numbered symbols are mapped to the I and Q branch, respectively. For all channels except AICH, symbol number zero is defined as the first symbol in each frame. For AICH, symbol number zero is defined as the first symbol in each access slot. The I and Q branches are then spread to the chip rate by the same real-valued channelization code $C_{ch,SF,m}$. The sequences of real-valued chips on the I and Q branch are then treated as a single complex-valued sequence of chips.

This sequence of chips is scrambled (complex chip-wise multiplication) by a complex-valued scrambling code $S_{dl,n}$. In case of P-CCPCH, the scrambling code is applied aligned with the P-CCPCH frame boundary, i.e., the first complex chip of the spread P-CCPCH frame is multiplied with chip number zero of the scrambling code. In case of other downlink channels, the scrambling code is applied aligned with the scrambling code applied to the P-CCPCH. In this case, the scrambling code is thus not necessarily applied aligned with the frame boundary of the physical channel to be scrambled.

FIG. 3 illustrates how different downlink channels are combined. Each complex-valued spread channel corresponding to point S in FIG. 2, is separately weighted by a weight factor $G_i$. The complex-valued P-SCH and S-SCH are separately weighted by weight factors $G_p$ and $G_s$. All downlink physical channels are then combined using complex addition.

The channelization codes of FIG. 2 are the same codes as used in the uplink, namely, OVSF codes that preserve the orthogonality between downlink channels of different rates and SFs. The channelization code for the Primary CPICH is fixed to $C_{ch,256,0}$ and the channelization code for the Primary CCPCH is fixed to $C_{ch,256,1}$. The channelization codes for all other physical channels are assigned by UTRAN. With the spreading factor 512, a specific restriction is applied. When the code word $C_{ch,512,n}$, with n=0,2,4 . . . 510, is used in soft handover, then the code word $C_{ch,512,n+1}$ is not allocated in the Node Bs where timing adjustment is to be used. Respectively, if $C_{ch,512,n}$, with n=1,3,5 . . . 511 is used, then the code word $C_{ch,512,n-1}$ is not allocated in the Node B where timing adjustment is to be used.

This restriction shall not apply for the softer handover operation or in case UTRAN is synchronised to such a level that timing adjustments in soft handover are not used with spreading factor 512. When compressed mode is implemented by reducing the spreading factor by 2, the OVSF code used for compressed frames is:

$C_{ch,SF/2,\lfloor n/2 \rfloor}$, if ordinary scrambling code is used.

$C_{ch,SF/2,n \bmod SF/2}$, if alternative scrambling code is used;

where $C_{ch,SF,n}$ is the channelization code used for non-compressed frames.

In case the OVSF code on the PDSCH varies from frame to frame, the OVSF codes shall be allocated such a way that the OVSF code(s) below the smallest spreading factor will be from the branch of the code tree pointed by the smallest spreading factor used for the connection. This means that all the codes for UE for the PDSCH connection can be generated according to the OVSF code generation principle from smallest spreading factor code used by the UE on PDSCH. In case of mapping the DSCH to multiple parallel PDSCHs, the same rule applies, but all of the branches identified by the multiple codes corresponding to the smallest spreading factor may be used for higher spreading factor allocation.

The OVSF codes are structurally constructed in the form of a tree. In the light of the structural characteristic, if an upper code is used in the tree, it has no orthogonal property with every lower code, so that the lower codes cannot be used. If even one lower code is used, its upper codes cannot be used. For example, in FIG. 4, if an SF=4 code $C_{4,0}$ is used, then every code in the tree of $C_{4,0}$ including $C_{8,0}$ and $C_{8,1}$ is occupied, so that it is not possible to assign the lower codes. On the contrary, if a code $C_{16,1}$ is used, not only $C_{8,0}$ and $C_{4,0}$, which are upper codes of the code $C_{16,1}$, are occupied, but also lower codes of the code $C_{16,1}$ are occupied.

This is merely a characteristic of the OVSF codes, not a problem. However, due to the characteristic of the OVSF codes, there occurs a problem. For example, there exist four SF=4 codes: one in each tree. Therefore, if a certain code in a lower part of the tree is assigned to a specific channel, it is not possible to assign new codes. In a sequential or random assignment method, there exists a previously assigned code in the middle of each tree during repeated assignment and release of the codes, so that in some cases, it is not possible to assign an upper code, i.e., a code for a higher data rate.

A need therefore exists for a method and system for downlink channelization code allocation or assignment in a UMTS which generate a code to be assigned to a new channel through a route having the minimum influence and which leave reserved codes by managing generation and release of the OVSF codes to prevent situations where the new channel cannot be assigned an OVSF code due to a lack of OVSF codes, even though there is enough available power and enough available channels.

SUMMARY OF THE INVENTION

The present disclosure provides a method and system for downlink channelization code assignment or allocation in a UMTS while maintaining the existing or assigned OVSF codes. The method and system generate an optimal channelization or OVSF code to be assigned to a new channel through a route having the minimum influence. The inventive method and system leave reserved codes by managing generation and release of the OVSF codes. This prevents situations where the new channel cannot be assigned an OVSF code due to a lack of OVSF codes, even though there is enough available power and enough available channels.

The method according to the present invention for determining an optimal channelization or OVSF code for assignment to a channel in a UMTS includes the steps of extending the plurality of channelization codes in the form of a tree structure having a plurality of sub-trees; determining if a flag of at least one of a plurality of channelization code numbers corresponding to respective channelization codes of a plurality of channelization codes should be set or released; receiving a spreading factor, if it is determined that the flag of the at least one of the plurality of channelization code numbers should be set; using the spreading factor and the tree structure to determine the optimal channelization code; generating and assigning a channelization code number for the optimal channelization code; and setting the flag of at least the generated channelization code number, thereby setting the flag for the at least one of the plurality of channelization code numbers which includes setting the flag of a channelization code number corresponding to the optimal channelization code.

The method further includes the steps of receiving the spreading factor and at least one channelization code number, if it is determined that the flag of the at least one of the plurality of channelization code numbers should be released; and releasing the flag of the at least one of the plurality of channelization code numbers.

The step of using the spreading factor and the tree structure to determine the optimal channelization code includes the steps of checking a flag corresponding to an optimum channelization code number of the plurality of channelization code numbers; determining whether a channelization code of the plurality of channelization codes which corresponds to the checked flag is available; and identifying the channelization code as the optimal channelization code and proceeding to the step of generating and assigning the channelization code number for the optimal channelization code, if it is determined that the channelization code which corresponds to the checked flag is available. The method further includes the step of generating a message indicating that there is no available channelization code of the plurality of channelization codes, if it is determined that the channelization code which corresponds to the checked flag is unavailable.

Additionally, the step of using the spreading factor and the tree structure to determine the optimal channelization code includes the steps of determining a sub-tree having the maximum value according to a sub-tree value system; starting from the sub-tree having the maximum value, checking whether a channelization code of the plurality of channelization codes and corresponding to the spreading factor can be assigned to the sub-tree; and identifying the checked channelization code as the optimal channelization code if the checked channelization code can be assigned. The method further includes the steps of determining if there is at least one additional channelization code of the plurality of channelization codes to be assigned to at least one additional sub-tree; and checking at least one additional subsequent sub-tree having the next maximum value according to the sub-tree value system, if it is determined that there is at least one additional channelization code to be assigned.

Further, the step of using the spreading factor and the tree structure to determine the optimal channelization code includes the steps of determining if there is at least one pair of channelization codes of the plurality of channelization codes in a particular sub-tree of the tree structure which can be assigned in pair; and assigning channelization code numbers to any determined pair of channelization codes. The method further includes the steps of checking the flag corresponding to the minimum channelization code number of the plurality of channelization code numbers and to the spreading factor, if it is determined that there are no pairs of channelization codes which can be assigned in pair; determining whether the flag corresponding to the minimum channelization code number has a value equal to a predetermined value; assigning a channelization code number if the flag corresponding to the minimum channelization code number has a value equal to the predetermined value; and repeating the above three steps, after shifting to another sub-tree of the tree structure, if none of the flags corresponding to the spreading factor for the particular sub-tree have a value equal to the predetermined value.

The system of the present invention includes data processing circuitry having one or more processors for executing programmable instructions to perform the steps of the inventive method.

BRIEF DESCRIPTION OF THE DRAWINGS

The invention is further explained by way of example and with reference to the accompanying drawings, wherein.

DETAILED DESCRIPTION OF PREFERRED EMBODIMENTS

The method and system of the present invention for assigning an optimal Orthogonal Variable Spreading Factor (OVSF) code, also known as a channelization code, for separation of downlink channels to a new channel, while maintaining the existing OVSF codes, are realized by an inventive algorithm capable of being stored and executed by at least one processor. The inventive algorithm as illustrated by the flow charts of FIGS. 8 and 9 has four main functions. The four main functions are the following:
1. OVSF code optimum search function;
2. OVSF code generation function;
3. OVSF code tree flag setting function; and
4. OVSF code release and flag release function.

Figure 1:
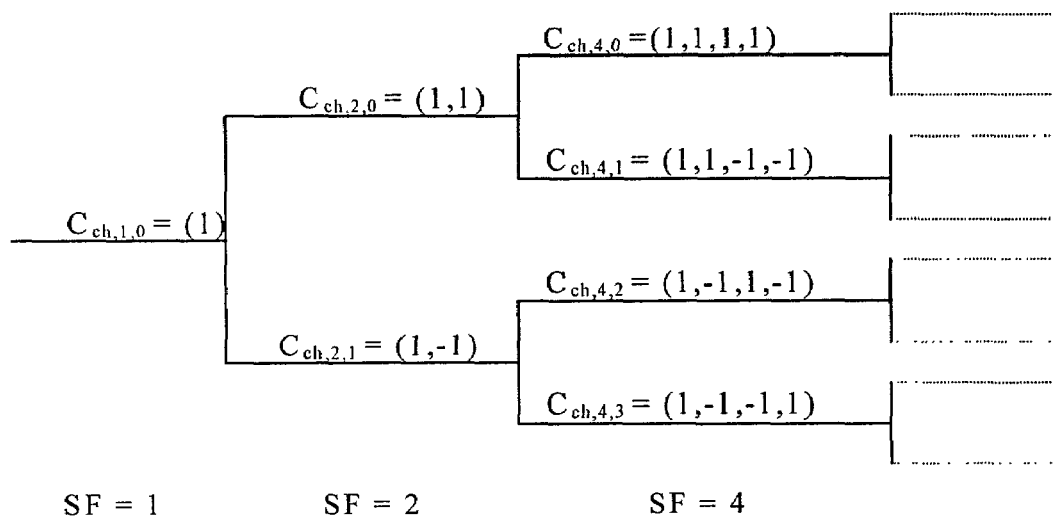
FIG. 1 is a diagram of a code tree for generation of OVSF codes according to the prior art.
Figure 2:
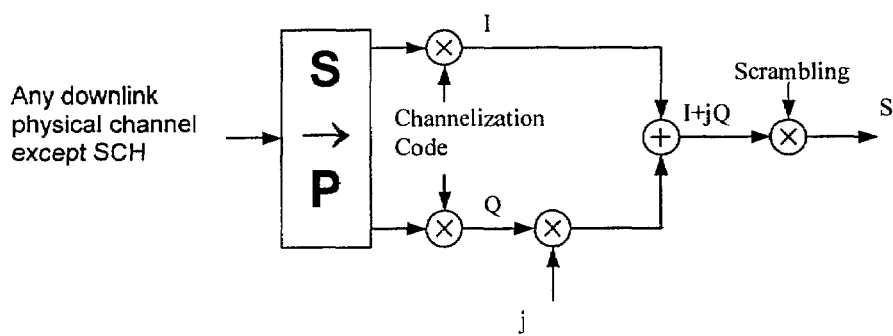
FIG. 2 is a diagram illustrating spreading for all downlink physical channels except the SCH channel according to the prior art.
Figure 3:
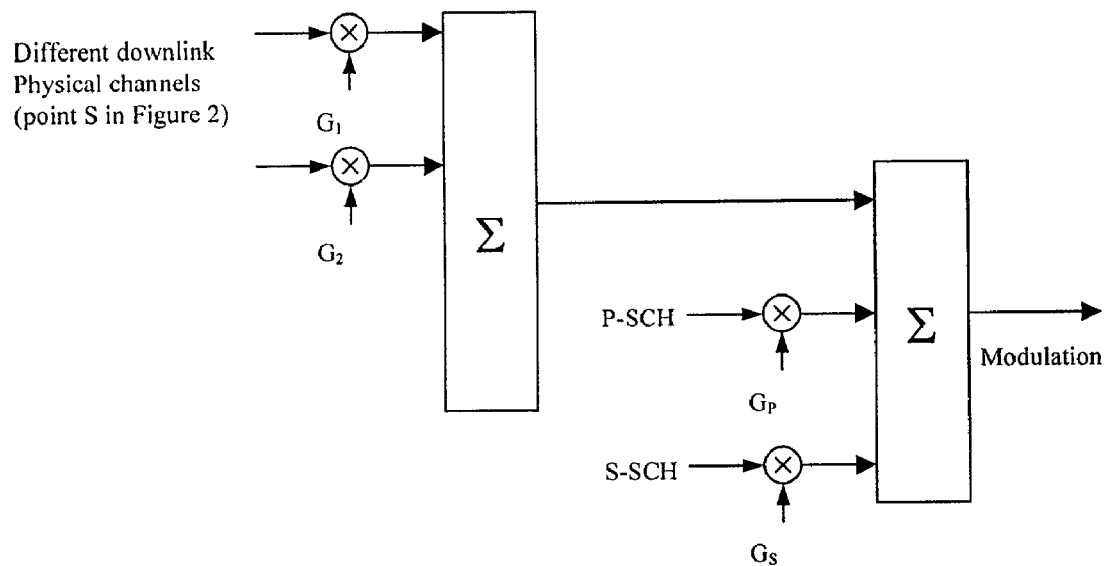
FIG. 3 is a diagram illustrating spreading and modulation for the SCH and P-CCPCH channels according to the prior art.
Figure 4:
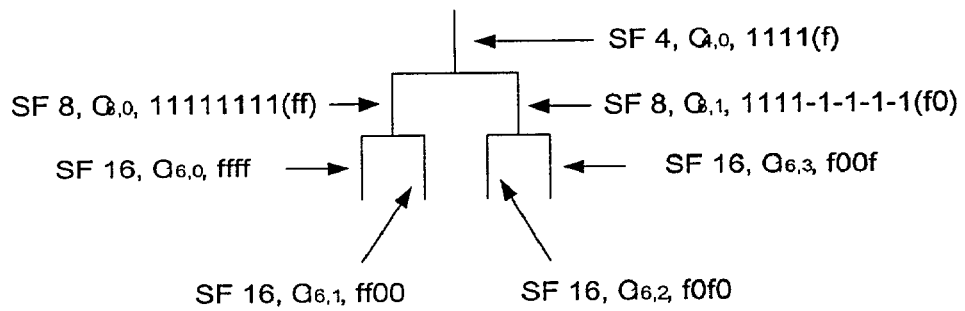
FIG. 4 is a diagram illustrating how to assign the OVSF codes according to the prior art.
Figure 5:
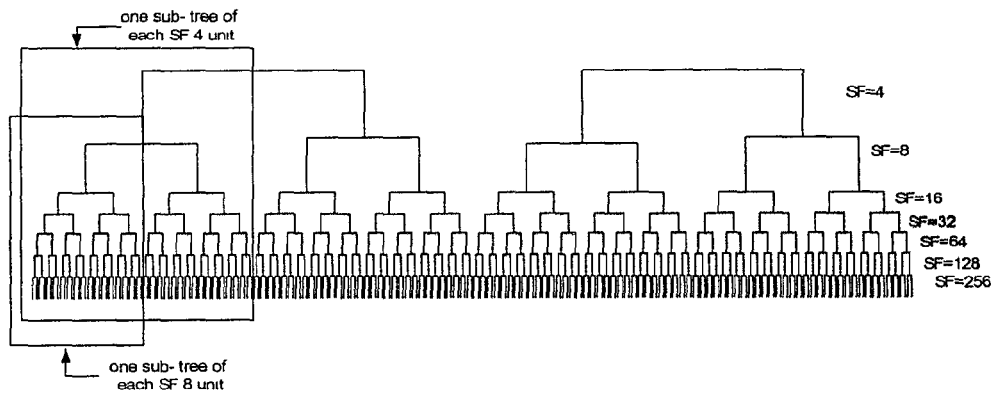
FIG. 5 is a diagram showing an overall structure of the OVSF code tree used in realizing the present invention.

The OVSF codes can be extended in the form of a tree structure as shown in FIG. 5. As shown by FIG. 5, the OVSF codes include four sub-trees in an SF=4 unit or eight sub-trees in an SF=8 unit. The minimum SF is 4 (SF=4). However, in the downlink, SF=8 supports a 384 Kbps physical channel, so that it is also possible to manage the sub-trees in an SF=8 unit.

1. OVSF Code Optimum Search Function

This function searches currently empty channels. This function also searches channels suitable for a spreading factor and a channel to be assigned an optimal channelization code which is to be determined by an optimum OVSF code search (step 806 of FIG. 8, see also FIG. 9).

2. OVSF Code Generation Function

Figure 8:
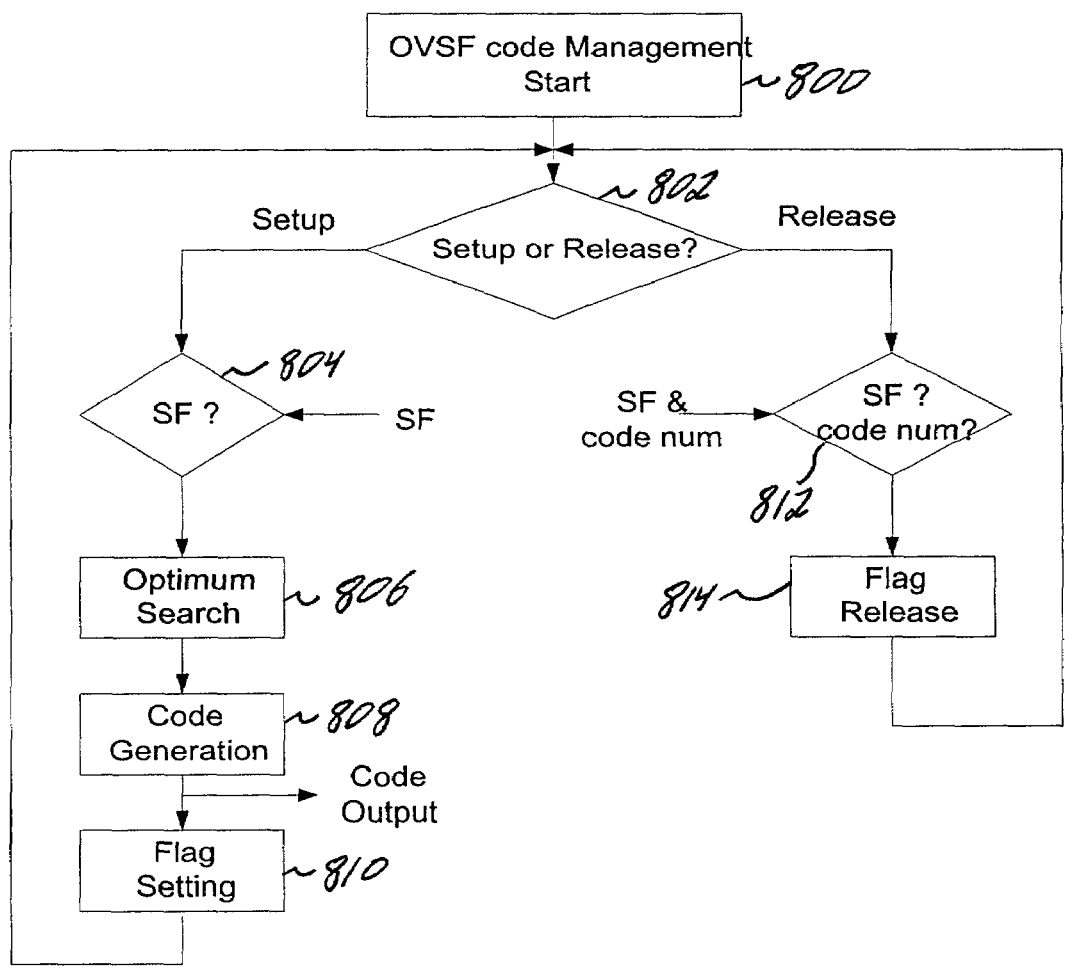
FIG. 8 is a flow chart illustrating the method of assigning OVSF codes according to the present invention.

This function generates and assigns an OVSF code number to the optimum channelization or code determined by the optimum search function (step 808 of FIG. 8).

3. OVSF Code Tree Flag Set Function

In order to make it possible to detect a current code assignment state by a part for managing flags of the code tree, every OVSF code number corresponding to each SF has a unique flag. Not only the flag corresponding to the generated code number, but also every flag in the lower tree are all set (step 810 of FIG. 8). In the upper tree, a flag corresponding to at least one branch over the generated code number's tree is set.

Figure 6:
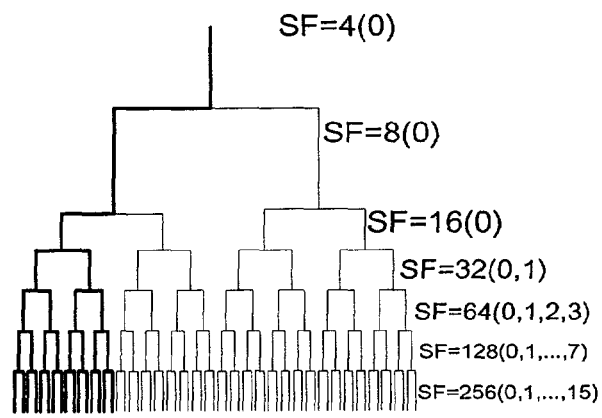
FIG. 6 is a diagram showing a flag(x,y) set for an SF=16, code #0, where 'x,y' in the parenthesis indicates the code number, according to the present invention.

This is shown in FIG. 6 by way of example. As illustrated in FIG. 6, if a flag of an SF=16, code #0 is represented by flag(16,0), not only flag(16,0) (i.e., the root branch assigned the generated channelization code number) but also the corresponding upper flags of flag(4,0) and flag(8,0) and the corresponding lower flags of flag(32,0), flag(32,1), flag(64, 0~1), flag(128,0~3), flag(256,0~7) are set.

4. OVSF Code Release and Flag Release Function

Figure 7:
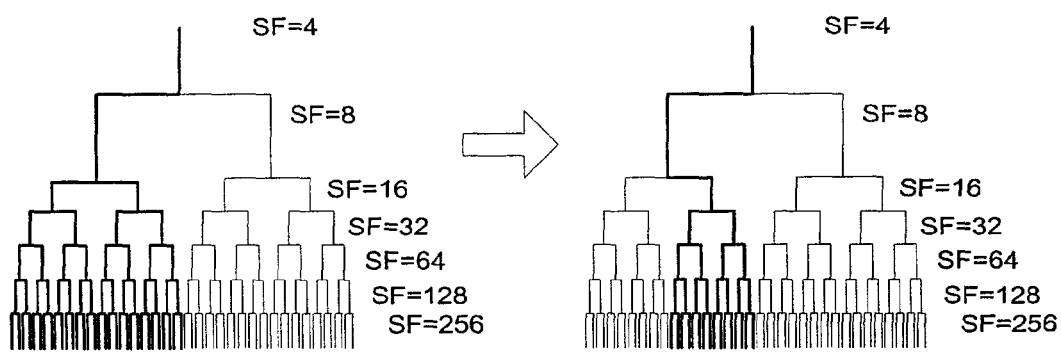
FIG. 7 is a diagram showing a case where a code #0 out of assigned SF=16, codes #0 and #1 is released according to the present invention.

This function releases an exhausted code, use of which is finished. In contrast to the tree flag setting function, this function releases flags occupied in the upper and lower trees (step 814 of FIG. 8). When a code paired with the exhausted code is in use, the upper flags are not released. For example, as illustrated in FIG. 7, if SF=16, code #1 is in use while SF=16, code #0 is released, the flag(8,0) and flag(4,0) are not released.

With reference to FIG. 8, there is shown a flow chart illustrating the method of assigning OVSF codes according to the present invention. The method starts at step 800 and proceeds to step 802 where it is determined whether an OVSF flag needs to be set or released. If the OVSF flag needs to be set, the method proceeds to step 804. At step 804, the spreading factor is determined.

The optimum search function is then executed at step 806 to search the currently empty channels and channels suitable for a spreading factor as noted by item number one above. A search is also performed by the optimum search function to locate a channel to be assigned. Once the optimum channelization code is determined by the optimum search function, the method proceeds to step 808.

The optimum channelization or OVSF code is described as an OVSF code which is available for assignment to a channel and also does not block other available OVSF codes from being assigned. As a side note, the downlink channelization or OVSF codes for all physical channels are assigned by UTRAN. The OVSF codes preserve the orthogonality between downlink channels of different rates and SFs. In light of the structural characteristic of OVSF codes, if an upper code is used in the tree, it has no orthogonal property with every lower code, so that the lower codes in the tree cannot be used. Even if one lower code is used, its upper codes cannot be used, because orthogonality is not preserved between the lower code and the upper codes. Therefore, OVSF codes have to be assigned systematically in order to avoid the lack of OVSF codes. OVSF codes which are assigned systematically are referred to as optimum OVSF codes. Accordingly, the present invention assigns OVSF codes systematically, since it searches for the optimum OVSF code and assigns the same systematically to avoid the lack of OVSF codes.

Continuing with step 808 in FIG. 8, where an OVSF code is generated by the OVSF code generation function. The OVSF code generation function generates and assigns an OVSF code to the optimum channelization or code number determined by the optimum search function. The generated OVSF code is outputted to the OVSF code tree flag set function at step 810 and is also outputted externally as shown by FIG. 8. The OVSF code tree flag set function sets the flags corresponding to the generated OVSF code number and other appropriate code numbers. Once the flags are set by the OVSF code tree flag set function, the method proceeds to step 802.

If in step 802 it is determined that an OVSF flag needs to be released, the method proceeds to step 812. At step 812, the method receives a SF and an OVSF code number whose flag is to be released. The method then proceeds to step 814 where the flag for the OVSF code number received in step 812 is released. The method then proceeds back to step 802.

Figure 9:
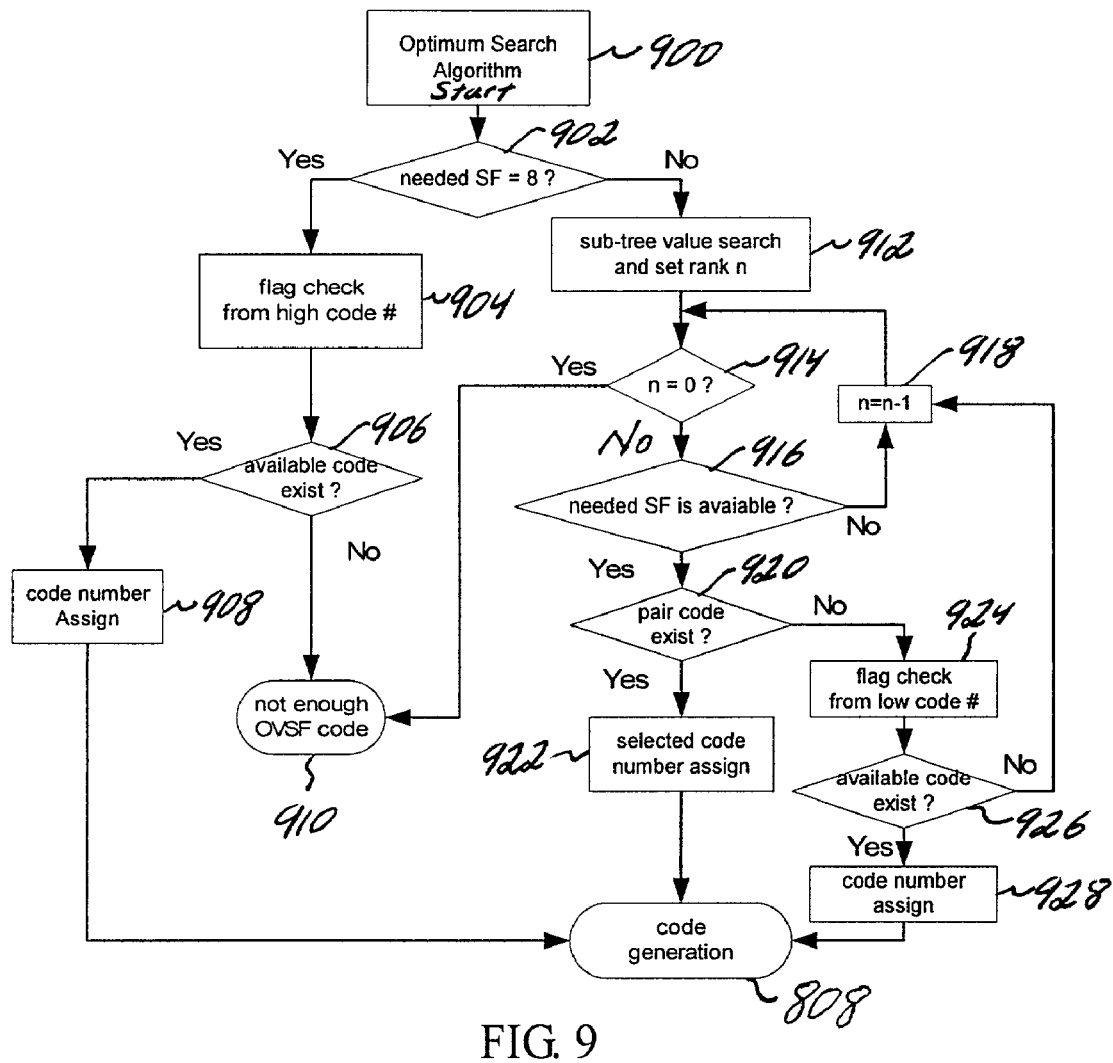
FIG. 9 is a flow chart illustrating the optimum search function according to the present invention.

A detailed description will now be provided describing the steps of the optimum search function with reference to FIG. 9. With reference to FIG. 9, there are shown exemplary steps of the optimum search function for SF=8. The optimum search function is initiated at step 900 and proceeds to step 902, where it is determined whether a spreading factor equal to eight is needed. If a spreading factor equal to eight is needed, the optimum search function proceeds to step 904.

At step 904, the flag corresponding to the highest or optimum code number is checked. The function then determines at step 906 whether the channelization code corresponding to the highest code number, i.e., the code number whose flag was checked, is available. If the channelization code corresponding to the checked flag is available, the code corresponding to the code number whose flag was checked is identified or deemed as the optimal channelization code. Hence, a channelization or OVSF code number is assigned to the available code (steps 908 and 808) by executing the OVSF code generation function. As noted above, this function assigns an OVSF code number to the available channelization or OVSF code. If at step 906 it is determined that there is no available code, a message is generated at step 910 indicating that there is no available channelization or OVSF code.

(1) In other words, when a SF corresponding to a reference value for a sub-tree (n) is required as determined by step 902, a code corresponding to flag(0) is assigned by searching from the leftmost code number, i.e., maximum or optimum code number of the code tree, at step 904.

Herein, although the description with reference to FIG. 9 is made for the reference SF=8 in a system not supporting SF=4, it is also possible to use the reference SF=4. Further, it is also possible to use a value other than four and eight for the SF, according to the maximum data rate of the system.

If an SF corresponding to the reference value of the sub-tree is assigned, the sub-tree is fully occupied. Hence, there are no available OVSF codes in the sub-tree for assignment (steps 906 and 910). If the SF corresponding to the reference value of the sub-tree is not assigned, i.e., there is an available OVSF code in the sub-tree for assignment as determined by step 906, an OVSF code number is assigned to the available OVSF code at step 908. The available channelization or OVSF code is identified or deemed the optimal channelization code.

(2) When an SF is less than a reference value of the sub-tree (n), the channelization codes must be assigned starting from a sub-tree corresponding to the maximum value out of the values of the code tree (see Table 1), i.e., the maximally occupied sub-tree. Therefore, a current assignment rank of each sub-tree is determined to determine a ranking order of the sub-trees starting from the sub-tree having the maximum value.

When the sub-tree having the maximum value is determined, then, starting with that sub-tree, a check is made to determine whether it is possible to assign at least one OVSF code systematically, i.e., by first assigning the highest value OVSF code, where the at least one OVSF code corresponds to a desired SF to the sub-tree having the maximum sub-tree value (step 912). If there are additional codes to be assigned systematically to one or more sub-trees, a sub-tree having the next maximum value according to the ranking order is checked, and so on (steps 914, 916 and 918). The first assigned channelization or OVSF code according to this procedure is identified or deemed the optimal channelization code.

(3) When the code assignment is available in the sub-tree (n), i.e., when a value calculated by adding a value corresponding to a code to be assigned to a value of a flag-set tree is less than a maximum tree value of the sub-tree, as determined by step 916, it is first determined whether there exist codes which can be assigned in pair (step 920). If so, the codes are assigned (steps 922 and 808). The reason for first searching the code pair is because the pair-based assignment method is a most effective code assignment method while occupying the same tree value.

When there are no codes to be assigned in pair, the flag is checked from the minimum code number corresponding to the desired SF in the sub-tree (step 924) to determine whether the flag has a value of zero (step 926). If the flag has a value of zero, a corresponding code number is assigned to the available code, i.e., the optimal channelization code (steps 928 and 808). If none of the flags corresponding to the desired SF have a value of zero, the above process will be repeated after a shift to the next sub-tree (n=n−1) based on the rank of the sub-tree value (step 918), and so on, until an available or optimal channelization code is determined.

Table 1 below shows values of OVSF codes in the tree. From the structural characteristic of the OVSF code, it is noted that a value of one SF=128 code is equivalent to a value of 2 SF=256 codes. Therefore, as described in (3) above, when the sub-tree is constructed based on SF=8, a maximum tree value of one sub-tree becomes 32. This shows that assigning one SF=8 code is equivalent to assigning 32 SF=256 codes. Therefore, the rank can be determined according to the tree value of the current sub-tree. To assign a new code, the codes are searched starting from the sub-tree having the maximum value.

Table 1 shows detailed information of the OVSF code tree.

| Spreading Factor | First Tree Channel No. | Second Tree Channel No. | Third Tree Channel No. | Fourth Tree Channel No. | Tree Value |
|---|---|---|---|---|---|
| 4 | 0 | 1 | 2 | 3 | 64 |
| 8 | 0~1 | 2~3 | 4~5 | 6~7 | 32 |

-continued

| Spreading Factor | First Tree Channel No. | Second Tree Channel No. | Third Tree Channel No. | Fourth Tree Channel No. | Tree Value |
|---|---|---|---|---|---|
| 16 | 0~3 | 4~7 | 8~11 | 12~15 | 16 |
| 32 | 0~7 | 8~15 | 16~23 | 24~31 | 8 |
| 64 | 0~15 | 16~31 | 32~47 | 48~63 | 4 |
| 128 | 0~31 | 32~63 | 64~95 | 96~127 | 2 |
| 256 | 0~63 | 64~127 | 128~191 | 192~256 | 1 |

To realize a DSCH (Downlink Shared Channel), a sub-tree below an SF value matched with the minimum data rate, i.e., a sub-tree in an SF=4 or 8 unit is reserved, so that the DSCH is changed in the reserved one sub-tree. That is, because the DSCH varies a rate of the physical channel in the light of its characteristic, the SF is frequently changed. Thus, it is possible to maintain the channels without lack of the OVSF codes, by reserving the sub-tree.

The system of the present invention includes data processing circuitry having one or more processors for executing programmable instructions to perform the steps of the inventive method.

It will be understood that various modifications may be made to the embodiments disclosed herein and that the above description should not be construed as limiting, but merely as exemplifications of preferred embodiments. Accordingly, those skilled in the art will envision other modifications within the scope and spirit of the claims appended hereto.

What is claimed is:

1. A method for determining an optimal channelization code for assignment to a channel in a Universal Mobile Telecommunication System (UMTS), said method comprising the steps of:
   extending a plurality of channelization codes in the form of a tree structure having a plurality of sub-trees;
   determining if a flag of at least one of a plurality of channelization code numbers corresponding to respective channelization codes of the plurality of channelization codes should be set or released;
   receiving a spreading factor, if it is determined that the flag of the at least one of the plurality of channelization code numbers should be set;
   determining the optimal channelization code using the spreading factor and the tree structure, comprising the steps of:
   generating and assigning a channelization code number for the optimal channelization code; and
   setting the flag of at least the generated channelization code number, by setting the flag of a channelization code number corresponding to the optimal channelization code and setting the flags corresponding to channelization code numbers assigned to a particular sub-tree of the tree structure.

2. The method according to claim 1, further comprising the steps of:
   receiving the spreading factor and at least one channelization code number, if it is determined that the flag of the at least one of the plurality of channelization code numbers should be released; and
   releasing the flag of the at least one of the plurality of channelization code numbers.

3. The method according to claim 2, further comprising the step of maintaining at least one flag corresponding to one or more channelization code numbers of the plurality of channelization code numbers set.

4. The method according to claim 3, wherein the one or more channelization code numbers are assigned to one or more channelization codes located above at least one channelization code corresponding to the at least one of the plurality of channelization code numbers in the tree structure.

5. The method according to claim 1, wherein a root branch of the particular sub-tree is assigned the generated channelization code number.

6. The method according to claim 1, wherein the step of setting the flag of the generated channelization code number comprises the step of setting at least one flag corresponding to at least one channelization code number assigned to at least one branch above the particular sub-tree in the tree structure.

7. The method according to claim 1, wherein the step of determining the optimal channelization code comprises the steps of:
   checking a flag corresponding to an optimum channelization code number of the plurality of channelization code numbers;
   determining whether a channelization code of the plurality of channelization codes which corresponds to the checked flag is available; and
   identifying the channelization code as the optimal channelization code and proceeding to the step of generating and assigning the channelization code number for the optimal channelization code, if it is determined that the channelization code which corresponds to the checked flag is available.

8. The method according to claim 7, further comprising the step of generating a message indicating that there is no available channelization code of the plurality of channelization codes, if it is determined that the channelization code which corresponds to the checked flag is unavailable.

9. The method according to claim 1, wherein the step of determining the optimal channelization code comprises the steps of:
   determining a sub-tree having the maximum value according to a sub-tree value system;
   starting from the sub-tree having the maximum value, checking whether a channelization code of the plurality of channelization codes and corresponding to the spreading factor can be assigned to the sub-tree; and
   identifying the checked channelization code as the optimal channelization code if the checked channelization code can be assigned.

10. The method according to claim 1, further comprising the steps of:
   determining if there is at least one additional channelization code of the plurality of channelization codes to be assigned to at least one additional sub-tree; and
   checking at least one additional subsequent sub-tree having the next maximum value according to the sub-tree value system, if it is determined that there is at least one additional channelization code to be assigned.

11. The method according to claim 1, wherein the step of determining the optimal channelization code comprises the steps of:
   determining if there is at least one pair of channelization codes of the plurality of channelization codes in a particular sub-tree of the tree structure which can be assigned in pair; and
   assigning channelization code numbers to any determined pair of channelization codes.

12. The method according to claim 11, further comprising the steps of:
   checking the flag corresponding to the minimum channelization code number of the plurality of channelization code numbers and to the spreading factor, if it is determined that there are no pairs of channelization codes which can be assigned in pair;
   determining whether the flag corresponding to the minimum channelization code number has a value equal to a predetermined value;
   assigning a channelization code number if the flag corresponding to the minimum channelization code number has a value equal to the predetermined value; and
   repeating the above three steps, after shifting to another sub-tree of the tree structure, if none of the flags corresponding to the spreading factor for the particular sub-tree have a value equal to the predetermined value.

13. The method according to claim 12, wherein the predetermined value is equal to zero.

14. The method according to claim 1, wherein the optimal channelization code is a channelization code which is available for assignment to the channel in the UMTS while maintaining assigned channelization codes.

15. A system for determining an optimal channelization code for assignment to a channel in a Universal Mobile Telecommunication System (UMTS), said system comprising at least one processor capable of executing programmable instructions for performing the steps of:
   extending the plurality of channelization codes in the form of a tree structure having a plurality of sub-trees;
   determining if a flag of at least one of a plurality of channelization code numbers corresponding to respective channelization codes of a plurality of channelization codes should be set or released;
   receiving a spreading factor, if it is determined that the flag of the at least one of the plurality of channelization code numbers should be set;
   determining the optimal channelization code using the spreading factor and the tree structure,
   generating and assigning a channelization code number for the optimal channelization code; and
   setting the flag of at least the generated channelization code number, by setting the flag of a channelization code number corresponding to the optimal channelization code and setting the flags corresponding to the channelization code numbers assigned to a particular sub-tree of the tree structure.

16. The system according to claim 15, wherein the at least one processor executes additional programmable instructions for performing the steps of:
   receiving the spreading factor and at least one channelization code number, if it is determined that the flag of the at least one of the plurality of channelization code numbers should be released; and
   releasing the flag of the at least one of the plurality of channelization code numbers.

17. The system according to claim 15, wherein the step of determining the optimal channelization code includes performing the steps of:
   checking a flag corresponding to an optimum channelization code number of the plurality of channelization code numbers;
   determining whether a channelization code of the plurality of channelization codes which corresponds to the checked flag is available; and
   identifying the channelization code as the optimal channelization code and proceeding to the step of generating and assigning the channelization code number for the optimal channelization code, if it is determined that the channelization code which corresponds to the checked flag is available.

18. The system according to claim 17, further performing the step of generating a message indicating that there is no available channelization code of the plurality of channelization codes, if it is determined that the channelization code which corresponds to the checked flag is unavailable.

19. The system according to claim 15, wherein the step of determining the optimal channelization code includes performing the steps of:
   determining a sub-tree having the maximum value according to a sub-tree value system;
   starting from the sub-tree having the maximum value, checking whether a channelization code of the plurality of channelization codes and corresponding to the spreading factor can be assigned to the sub-tree; and
   identifying the checked channelization code as the optimal channelization code if the checked channelization code can be assigned.

20. The system according to claim 15, further performing the steps of:
   determining if there is at least one additional channelization code of the plurality of channelization codes to be assigned to at least one additional sub-tree; and
   checking at least one additional subsequent sub-tree having the next maximum value according to the sub-tree value system, if it is determined that there is at least one additional channelization code to be assigned.

21. The system according to claim 15, wherein the step of determining the optimal channelization code includes performing the steps of:
   determining if there is at least one pair of channelization codes of the plurality of channelization codes in a particular sub-tree of the tree structure which can be assigned in pair; and
   assigning channelization code numbers to any determined pair of channelization codes.

22. The system according to claim 21, further performing the steps of:
   checking the flag corresponding to the minimum channelization code number of the plurality of channelization code numbers and to the spreading factor, if it is determined that there are no pairs of channelization codes which can be assigned in pair;
   determining whether the flag corresponding to the minimum channelization code number has a value equal to a predetermined value;
   assigning a channelization code number if the flag corresponding to the minimum channelization code number has a value equal to the predetermined value; and
   repeating the above three steps, after shifting to another sub-tree of the tree structure, if none of the flags corresponding to the spreading factor for the particular sub-tree have a value equal to the predetermined value.

23. The system according to claim 22, wherein the predetermined value is equal to zero.

24. The system according to claim 15, wherein the optimal channelization code is a channelization code which is available for assignment to the channel in the UMTS while maintaining assigned channelization codes.

25. A method for determining an optimal channelization code for assignment to a channel in a Universal Mobile Telecommunication System (UMTS), said method comprising the steps of:
- extending the plurality of channelization codes in the form of a tree structure having a plurality of sub-trees;
- determining if a flag of at least one of a plurality of channelization code numbers corresponding to respective channelization codes of a plurality of channelization codes should be set or released;
- receiving a spreading factor, if it is determined that the flag of the at least one of the plurality of channelization code numbers should be set;
- using the spreading factor and the tree structure to determine the optimal channelization code, comprising the steps of:
- determining if there is at least one pair of channelization codes of the plurality of channelization codes in a particular sub-tree of the tree structure which can be assigned in pair; and
- assigning channelization code numbers to any determined pair of channelization codes;
- generating and assigning a channelization code number for the optimal channelization code; and
- setting the flag of at least the generated channelization code number, thereby setting the flag for the at least one of the plurality of channelization code numbers which includes setting the flag of a channelization code number corresponding to the optimal channelization code.

26. The method according to claim 25, further comprising the steps of:
- checking the flag corresponding to a minimum channelization code number of the plurality of channelization code numbers and to the spreading factor, if it is determined that there are no pairs of channelization codes which can be assigned in pair;
- determining whether the flag corresponding to the minimum channelization code number has a value equal to a predetermined value;
- assigning a channelization code number if the flag corresponding to the minimum channelization code number has a value equal to the predetermined value; and
- repeating the above three steps, after shifting to another sub-tree of the tree structure, if none of the flags corresponding to the spreading factor for the particular sub-tree have a value equal to the predetermined value.

* * * * *